United States Patent [19]

Cederholm et al.

[11] Patent Number: 5,284,197
[45] Date of Patent: Feb. 8, 1994

[54] METHOD AND APPARATUS FOR PREPARING AND POSITIONING A WEB FOR SPLICING

[75] Inventors: Roger Cederholm, Roscoe, Ill.; Christopher J. Plude, Beloit, Wis.; John Siebel, Rockford, Ill.

[73] Assignee: Martin Automatic, Inc., Rockford, Ill.

[21] Appl. No.: 995,766

[22] Filed: Dec. 23, 1992

[51] Int. Cl.$^5$ .................. B32B 31/00; G05G 15/00
[52] U.S. Cl. .................. 156/350; 156/157; 156/159; 156/504; 156/513; 242/58.5
[58] Field of Search ............ 156/157, 159, 266, 502, 156/507, 513, 353, 354, 355, 504, 350; 242/58.1, 58.2, 58.3, 58.4, 58.5

[56] References Cited

U.S. PATENT DOCUMENTS

| | | | |
|---|---|---|---|
| 3,586,571 | 6/1971 | Szakacs | 156/353 |
| 4,046,614 | 9/1977 | Zahn et al. | 156/353 |
| 4,859,270 | 8/1989 | Martin et al. | 156/504 X |

Primary Examiner—David A. Simmons
Assistant Examiner—Paul M. Rivard
Attorney, Agent, or Firm—McAndrews, Held & Malloy, Ltd.

[57] ABSTRACT

A method and apparatus for facilitating a splicer operator's pre-splice preparation and positioning of the leading end of a new web for splicing, in a splicer, to the running web of an expiring roll. The webs both include regular and longitudinally spaced registration marks and identical, repeating and longitudinally spaced patterns.

A movable table is used for the initial, off line, pre-splice web preparations. It includes a fixture for guiding the leading end of the new web along a longitudinal path and a hole puncher adjacent to the path. An optical instrument is also mounted on the table and is movable transversely across the path. The optical instrument is spaced longitudinally a preselected distance from the hole puncher. The operator moves the new web along and the optical instrument across the path until a registration mark is aligned beneath the optical instrument. The operator then punches holes in the new web using the hole puncher. The leading end of the web is next introduced into the splicer and the web holes are placed over splicer locating pins mounted a preselected distance from a splicing reference position. An optical sensor is disposed a predetermined distance from the reference position and initiates the web splicing by signaling the passage of a registration mark on the running web.

13 Claims, 4 Drawing Sheets

METHOD AND APPARATUS FOR PREPARING AND POSITIONING A WEB FOR SPLICING

FIELD OF THE INVENTION

The present invention relates to methods and apparatus for preparing and positioning webs for splicing. More particularly, it relates to methods and apparatus for preparing and positioning the leading end of a new web, wound on a roll, for splicing in a splicer, where the leading end of the new web will thereafter be spliced to a web that is running from an expiring roll, through the splicer and then to downstream web processing and/or web handling operations.

BACKGROUND OF THE INVENTION

For years, various splicers have been used to splice a new web wound on a roll, to a running or expiring web wound on an expiring roll. At the time of the splice, the running web is usually being run through the splicer and then to and through one or more downstream web processing and/or web handling operations.

It has long been recognized by those working in the field that a splice should be made as expeditiously as possible. Depending on the splicer, the running web may be momentarily stopped or slowed during splicing. This may adversely affect the performance and efficiency of the downstream web processing/web handling operations if there is any delay in returning the spliced web to full speed running conditions.

To achieve expeditious splicing, it is obviously important to prepare and position the leading end of the new web for splicing before the time for making the splice is at hand. These pre-splice preparations are often done by an operator who may be responsible for several splicers. In many instances, the new web roll to be spliced is positioned close to the running, expiring roll and adjacent to the splicer. The operator must introduce or feed the leading end of the new web into the splicer and attempts to prepare and accurately position it in the splicer. Proper preparation and positioning is usually critical to the making of a "good" splice, and heretofore, have required the operator to exercise some degree of skill and care. This is not always an easy task because the expiring web is usually running, at full speed, nearby to where the new web's leading end must be positioned.

Usually there is a work space or aisle along side the splicer where the operator may stand during the new web preparation and positioning. Often he or she must bend over and lean into the splicer to prepare and position the leading end of the new web in the splicer. Not only is the proper preparation and positioning time consuming, but having the operator's hands, arms and head in the splicer, while the operator is attempting to concentrate on preparing and positioning the new web, poses potentially serious concerns for the safety of the operator as well as the potential for causing accidental damage or breakage to the running, expiring web.

These potential concerns are aggravated and accentuated when the new and running webs each have identical, regularly repeating and longitudinally spaced patterns on them. The operator is then required to prepare and position the new web so that the patterns are matched during splicing, that is, so that the regular repetition and longitudinal spacing of the patterns continues uninterruptedly across the splice. In the past, this required the operator to spend even more time measuring and adjusting the new web, often while leaning into the splicer, in order to be sure that the pattern of the new web was properly located with reference to a reference position in the splicer.

SUMMARY OF THE INVENTION

In principal aspects, the improved method and apparatus of the present invention facilitates operator preparations and positioning of the leading end of the new web for splicing. The present invention has particular utility where the new and expiring or running webs have identical, regularly repeating and longitudinally spaced patterns on them. Through the use of the invention, the operator may readily and quickly prepare the leading end of the new web, off line, in the work space or aisle adjacent to the side of the splicer. The operator then can quickly insert or introduce the new web's leading end into the splicer and there expeditiously and accurately position the leading end for trouble free splices. The present invention minimizes the amount of time that the operator must bend over or lean into the splicer to position the new web's leading end while assuring that there will be no interruption in the regular repetition and longitudinal spacing of the patterns across the splice.

Accordingly, it is an object of the present invention to provide an improved method and apparatus for preparing and positioning the leading end of a new web for splicing, in a splicer, to a web that is running from an expiring roll through the splicer and then to downstream web processing and/or web handling operations. A related object of the present invention is to provide such an improved method and apparatus where the operator may perform a substantial portion of the pre-splice preparations of the leading end of the new web off line, that is, in a work space or aisle adjacent to the splicer; and where the operator may thereafter quickly and accurately position the leading end in the splicer without having to spend relatively much time bending over or leaning into the splicer.

Another object of the present invention is to provide an improved method of preparing the leading end of a new web for splicing in a splicer where the new web is also wound on a roll; where the new web and the running web have identical, regularly repeating and longitudinally spaced patterns on them, which patterns need to be matched during splicing so that the regular repetition and longitudinal spacing of the patterns continues uninterruptedly across the splice; where the new web and the running web each have a series of regularly longitudinally spaced registration marks on them, which registration marks have a predetermined relationship with respect to the patterns on the web and with respect to adjacent registration marks; and where the splicer includes a pre-splice web reference position for the new web's leading end, a signal generating sensor for sensing the passage of a registration mark on the running web, with the sensor being spaced a predetermined distance from the pre-splice reference position, and means for actuating the splicing of the webs upon the receipt of a signal from the sensor. A related object of the present invention is to provide an improved method, as described, where the method includes the steps of identifying at least one point on the new web's leading end, which point has a preselected relationship with an adjacent registration mark; marking this identified point on the leading end; and then positioning the leading end in the splicer so that the leading end is ready for splicing and so that there is a preselected relationship between the identified marked point and the pre-spliced reference position of the splicer. Still another related object of the present invention is to provide an improved method, as described, where the marking of the identified point includes punching at least one hole in the leading end at the identified point; and where the accurate and expeditious positioning of the leading end of the splicer is achieved by disposing or placing the punched hole over a locating pin that is mounted in the splicer a preselected distance from the splicer's reference position.

Still another object of the present invention is to provide an improved method, as described, where at least two holes are punched in the leading end of the identified point; where after the holes are punched, the leading end is trimmed so that the leading edge of the leading end is adjacent to the punched holes; and where after the holes are disposed over the splicer locating pins, the new web is clamped with respect to the pre-spliced reference point and is then cut so that the cut leading edge of the new web is adjacent to the reference position.

A further object of the improved invention is to provide improved apparatus for preparing the new web's leading end for splicing, as described, in the off line work space or aisle adjacent to the side of the splicer, where the apparatus includes a movable work table adapted to be positioned in the work space and having a fixture that defines a path for receiving and guiding the new web's leading end, a hole puncher mounted adjacent to the path and adapted to punch holes in the leading end, and an optical instrument disposed adjacent to and movable transversely across the path, with the optical instrument being spaced a preselected distance from the hole puncher along the path; and where the optical instrument is usable by the operator so that by moving a new web along and the optical instrument across the path, the optical instrument may be aligned with a registration mark on the new web.

A still further object of the present invention is to provide an improved splicer for splicing a new web to a running, expiring web where the new web's leading end has been prepared, as described; and where the splicer locating pins are adjacent to the path of the running web, with the locating pins being spaced a preselected distance from the splicer reference position; where the pins being adapted to receive the holes in the new web and to thus accurately locate and at least momentarily hold the new web with respect to the splicer reference position; and where the splicer's signal generating sensor for sensing the passage of a registration mark on the running web is mounted on the splicer adjacent to the path of the running web and is spaced a predetermined distance from the reference position.

These and still other objects, advantages and aspects of the present invention are more fully disclosed in the detailed description of the preferred embodiment of the present invention which follows.

DESCRIPTION OF THE DRAWINGS

In the following detailed description of the preferred embodiment of the invention, reference will be made to the accompanying drawings comprising the following Figures.

DETAILED DESCRIPTION OF THE PREFERRED EMBODIMENT

Figures 1, 2, 6:
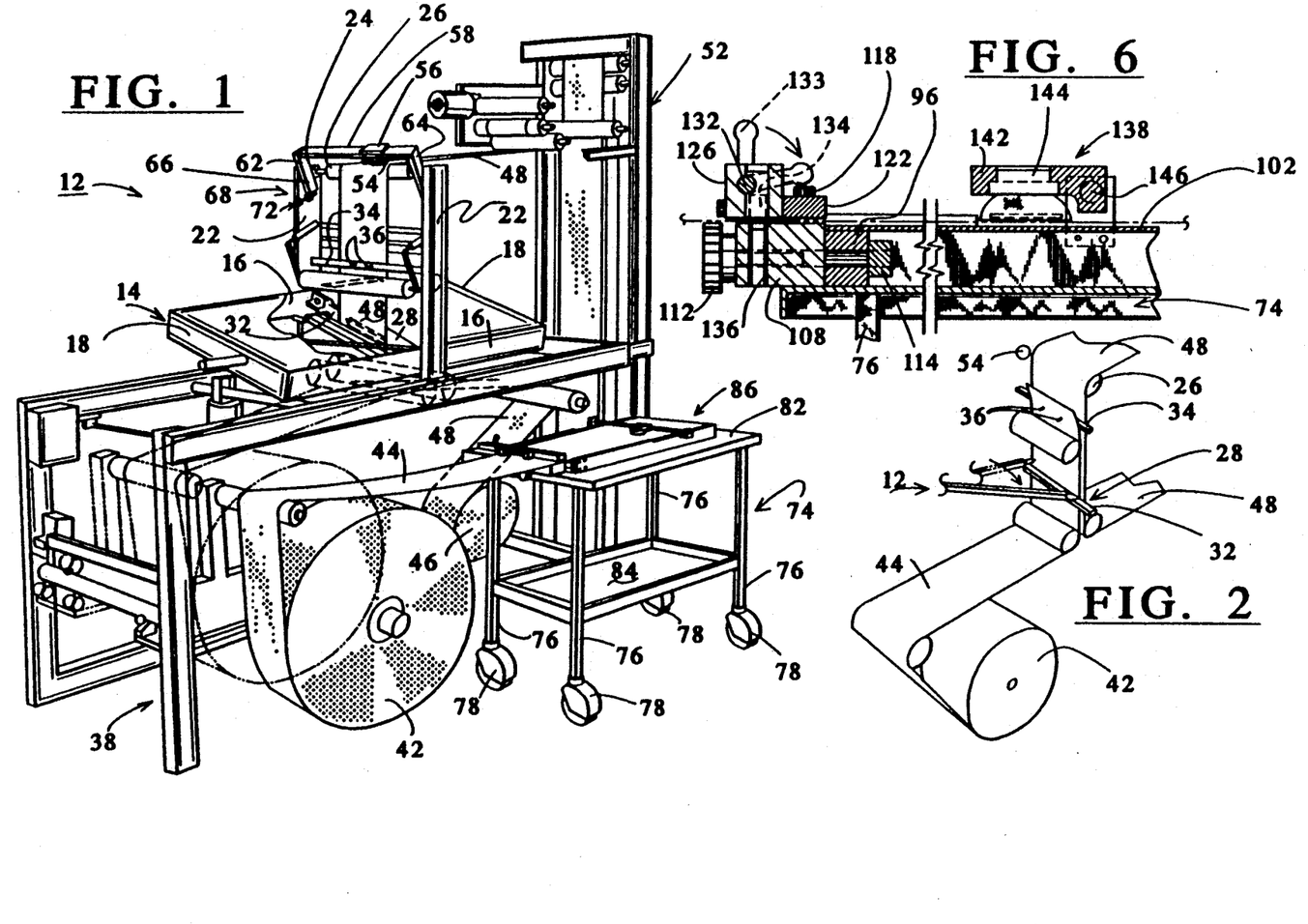
FIG. 1 is a front perspective view of the preferred embodiment of the improved splicer of the present invention and also shows a movable work table used to facilitate pre-splice preparations of the leading end of a new web.
FIG. 2 is a partial, schematic view of the improved splicer of FIG. 1.
FIG. 6 is a vertical cross-sectional view taken along the line 6—6 in FIG. 5.

Referring now to FIG. 1, a web splicer is generally shown at 12. Within the broad scope of the present invention, the splicer may be of any conventional design and construction so long as: there is space, adjacent to the downstream path of the running web, for mounting a signal generating sensor and one or more web locating pins; and the splicer includes a fixed reference position where the leading end of the new web (that is, the web to be spliced to the running web) is normally positioned prior to the splice.

The preferred embodiment of the splicer 12 has a construction and operates to splice the new and running webs as described in U.S. Pat. Nos. 4,801,342 and 4,923,546. The disclosure of these two patents is incorporated herein by reference, and a further detailed description of the splicer 12 will generally be limited to the novel features useful for the practice of this present invention and such structure as is needed to describe the location and operation of the features.

In this latter regard, the splicer 12 includes an open, generally rectangular frame 14 having two side members 16 and two end members 18 that are joined together at their ends. Two vertical, upright members 22 are secured to the side members 16 midway between the end members 18.

A shaft 24 extends between the upper ends of the upright members 22. It supports a conventional idler roll 26 for rotation about its longitudinal axis. The running web passes about the idler roll 26 as the web runs out of the splicer.

The plane of the frame 14 is disposed at an angle, with respect to the horizontal. By reason of this disposition of the frame, the operating components of the splicer "face" the operator side of the splicer 12 thereby facilitating operator access to them.

The splicer 12 also includes an anvil 28 that extends from one side of the frame 14 to the other and is secured, at its ends, to the side members 16 midway between their ends. The plane of the anvil 28 is vertical. The anvil's upper (as shown in FIGS. 1 and 2) or downstream (in terms of the direction that the webs run) edge 32 defines a reference position for positioning or lining up the leading edge of the leading end of the new web for splicing. It also serves as an edge for cutting the new web prior to splicing and for cutting the expiring web during a splice as described in detail in the aforementioned two patents and as generally illustrated in FIG. 2.

A pair of parallel rods 34, one of which is shown in FIG. 1, have their ends secured to the facing surfaces of the upright members 22. They are horizontally disposed and spaced apart sufficiently so that the web running in the splicer 12 may readily pass between them without coming into contact with them. Each rod 34 has a pair of parallel, relatively short, locating pins 36 secured to it. These pins perpendicularly project from the rods. The plane of each pair of pins 36 is disposed at an acute angle, slightly downwardly from the horizontal. The pairs of pins 36 are mirror images of each other.

The pins 36, in each pair of pins, are spaced apart a preselected distance. The pins are also disposed a preselected distance above the anvil reference position edge 32.

As best seen in FIG. 1, the splicer 12 is mounted on a stand, generally shown at 38. The structure of the stand 38 is as disclosed in U.S. Pat. No. 4,856,960. The disclosure of this patent is also incorporated herein by reference. As disclosed in that patent, a web roll may be readily moved by the operator from a position beneath the stand to one where it is disposed in the aisle or working space adjacent to the splicer and stand, and vice versa. In FIG. 1, a roll 42 of a new web 44 is shown mounted in this extended position. An expiring roll 46 of a running web 48 is shown mounted for rotation in the normal, roll unwind position beneath the stand 38 and also under the splicer 12. When both rolls 42 and 46 are mounted beneath the stand 38, they are adjacent to each other, with their axes being substantially parallel, so that web from both rolls may be fed to the splicer.

The webs 44 and 48 may be made of a variety of materials such as paper, film, foil, laminate, etc., and on their rolls, are wound about a central core or spool. As noted, the present invention has particular utility with regard to the splicing of webs that have identical, regularly repeating and longitudinally spaced patterns on them and where it is important that the regular repetition and longitudinal spacing of the patterns continues uninterruptedly across a splice. The webs 44 and 48 also include regularly, longitudinally spaced, conventional registration marks on them. These marks are typically longitudinally spaced apart a preselected distance and have a predetermined distance relationship with the patterns on the webs.

A conventional photo sensor 54 is mounted on a sensor mounting block assembly 56 so as to be adapted to sense the passage of a registration mark on the running web 48. A sensor mounting bar 58 supports the assembly 56 and sensor 54 adjacent to the running web 48 as it passes about the idler roll 26. The position of the assembly 56 along the bar 58 (and thus, with respect to and across the width of the web 48) may be manually adjusted by the operator. The ends of the mounting bar 58 are supported by a pair of sensor pivot clamps 62 and 64 that are, in turn, mounted on the shaft 24 which as noted also supports the idler roll 26.

Specifically and as best illustrated in FIG. 1, the clamp 62 is mounted on or clamped on the shaft 24 between the left end of idler roll 26 and the left upright member 22, and the clamp 64 is mounted or clamped on the shaft 24 between the right end of the idler roll and the right upright member 22. The clamps 62 and 64 are mounted on the shaft 24 so that they may be pivoted about the longitudinal axis of the shaft. The clamp 62 has an extending leg 66 that projects away from the portion of the clamp about the shaft 24 and that is generally aligned with the portion of the clamp connected with the bar 58.

A conventional adjusting screw mechanism 68 is mounted on the inner facing surface of the left upright member 22, as shown in FIG. 1, so that it is substantially perpendicular with the clamp leg 66 and so that its one end is adjacent to and may be brought into contact with the leg 66. Obviously and probably preferably, the mechanism 68 could be mounted on the right upright member 22 so as to be adjacent to the operator side of the splicer 12. The other end of the mechanism 68 has a manually rotatable knob 72. By rotating this knob, the operator may vary the position of the screw vis-a-vis the leg 66. By doing this, the operator may thus cause the clamp 62 (and through the bar 58, the clamp 64) to pivot about the shaft 24, and thereby adjust the position of the sensor 54 with respect to and about the web 48 as the web passes over the idler roll 26.

The sensor 54 may be a photo incandescent sensor. One such sensor is part No. LX12N made by the Sunx Trading Co. of Tokyo Japan. When actuated, the sensor 54 will "read" or sense the passage of a registration mark on the running web 48 and as a result, will generate a signal that causes the splicer 12 to splice the webs 44 and 48 together as described in Pat. Nos. 4,801,342 and 4,923,546. In doing this, the sensor 54 "reads" a registration mark on the running web when that registration mark is a preselected distance above or downstream from the reference position anvil 28. The setting of the distance of the sensor downstream from the reference position anvil 28 may, however, vary from pattern to pattern on the webs, and the operator may adjust the position of sensor 54 by the adjusting screw mechanism 68, and additionally, by moving the assembly 56 along the bar 58.

As noted above, the running web 48 passes around the idler roll 26 as it passes out of the splicer 12 so that the direction of the path of travel of the web changes from vertical to horizontal as the web passes about the roll 26. The web 48 then runs to and through an inertia compensated festoon assembly 52, preferably made in accordance with the teachings of U.S. Pat. Nos. 3,659,767, 4,519,858 and 4,915,282. The festoon assembly may be preferably structurally identical to those assemblies manufactured by Martin Automatic, Inc. of Rockford, Illinois. Thereafter the web 48 may run to and through a variety of conventional web handling and/or web processing operations.

As also shown in FIG. 1, the preparation of the leading end of the new web 44 may be facilitated by the use of a movable work table 74. This table may be moved by the operator between various splicers and is adapted to be positioned, when preparing a new web for a particular splicer, in the aisle or working space adjacent to that splicer. The web roll 42 of the new web 44 may also be moved by the operator into that working space adjacent to the table 74, as illustrated in FIG. 1 or the roll 42 may be left beneath the stand 38. In any event, the leading end of the new web 44 is unwound from the roll 42 and directed to the table.

As best shown in FIGS. 3-8, the table 74 is, itself, of a conventional design. It has four legs 76 that have conventional rollers or coasters 78 secured to their lower ends. The table's top 82 is generally flat and horizontally disposed. A shelf 84 may be supported between the legs 76 and disposed between the top 82 and the rollers 78.

As illustrated in FIGS. 3, 5, 7 and 8, a fixture, shown generally at 86, is secured on the top 82 by a plurality of socket head cap screws 88. The fixture 86 includes a first and second side bars 92 and 94 and first and second end bars 96 and 98. These bars are disposed in a generally rectangular, end to end arrangement on the top 82 and as noted, are secured to the top by a plurality of socket head cap screws 88 and to each other by the socket head cap screws 100. A relatively thin plate 102 is secured to the members 92, 94, 96 and 98 and defines a smooth surface for the leading end of the web 44 to be moved along.

The fixture 86 defines a longitudinal path along which the leading end of the new web 44 may be moved and positioned during off line web preparations. The first end bar 96 is the beginning or entrance to this path, the second end bar 98 defines the downstream end of the path, the side bars 92 and 94 form the sides of the path, and the plate 102 defines the lower surface of the path.

Referring now to FIGS. 3-6, a hole punch assembly 104 is mounted on the first end bar 96 by a clamp subassembly 106. This subassembly includes a transverse member 108 which is disposed upstream of, but adjacent to the end bar 96 and is held in place, by a pair of manually actuated, knob-headed screws 112. The distal ends or downstream ends of these screws are secured to a clamp member 114 that abuts the downstream side of the end bar 96.

Figures 3, 4:
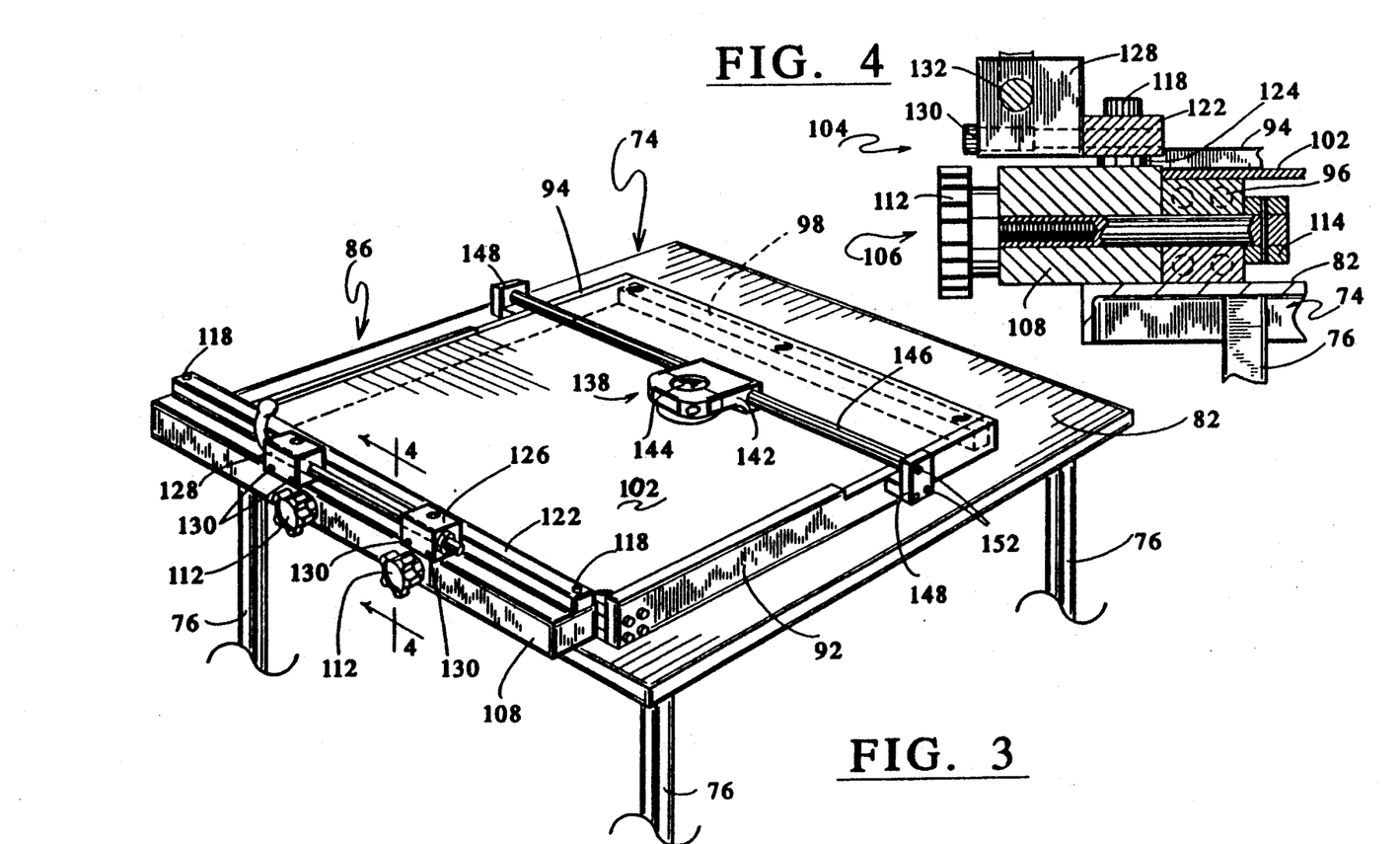
FIG. 3 is a perspective view of the upper portion and surface of the work table shown in FIG. 1.
FIG. 4 is a partial vertical, cross sectional view taken along the line 4—4 in FIG. 3.
Figure 5:
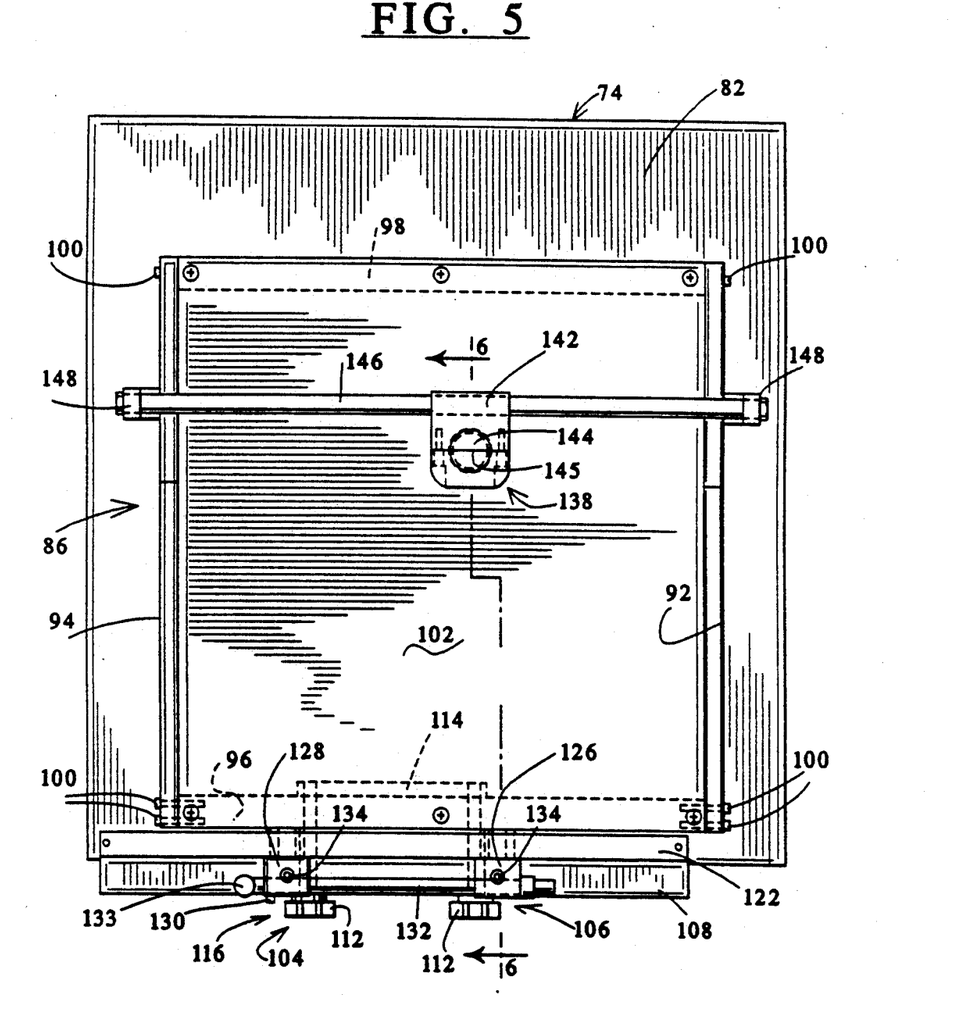
FIG. 5 is a top plan view of the top of the work table shown in FIGS. 1 and 3.
Figure 7:
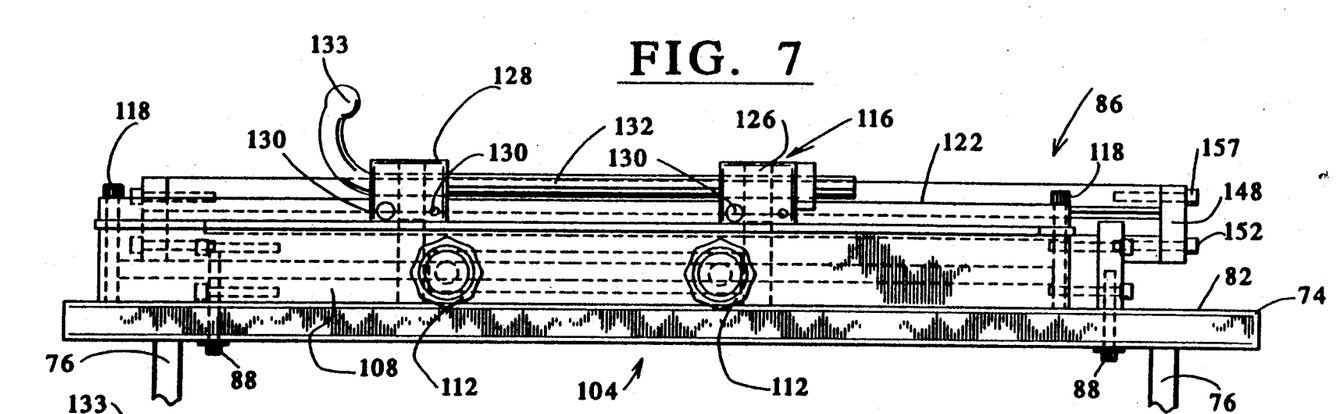
FIG. 7 is an end elevational view of the work table of FIG. 1 showing the hole puncher end of the table.
Figure 8:
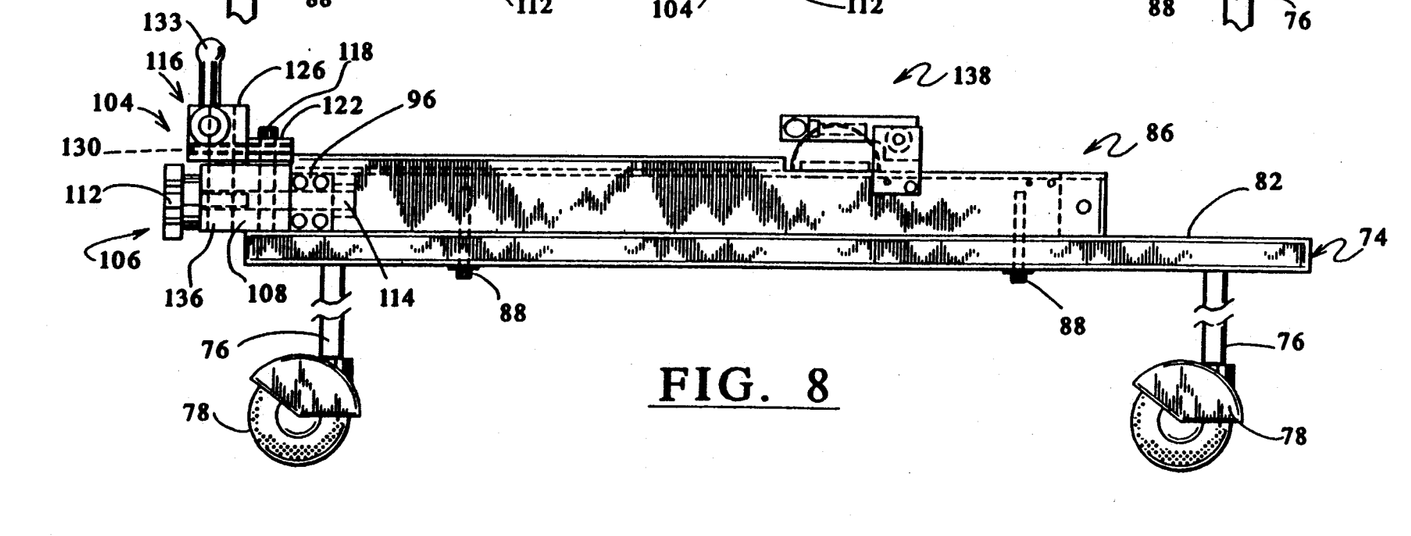
FIG. 8 is a side, elevational view of the work table of FIGS. 1 and 3 showing the relationship between the hole puncher and the optical instrument.

As best seen in FIGS. 4, 5 and 6, a punch subassembly 116 is mounted on the upper surface of the transverse member 108 by several socket head cap screws 118 that are located near the side bars 92 and 94. The subassembly 116 includes a first cross member 122 that is disposed parallel to but spaced slightly above the transverse member 108. The cross member 122 is, however, not as wide, in the direction of the longitudinal path, as the member 108. The vertical spacing between the members 108 and 122 is maintained by spacers 124 that surrounds the end cap screws 118 which, as noted, are used to mount the subassembly 116 on the member 108. The thickness of the spacers 124 are such that the new web 44 can be easily threaded or passed between the members 108 and 122.

The sub-assembly 116 also includes a pair of punch blocks 126 and 128 mounted by socket head cap screws 130, in transverse spaced relationship to one another and the side bars 92 and 94 on the cross member 122. The lower surfaces of the blocks 126 and 128 are horizontal and coplanar with the lower surface of the member 122. An actuating bar 132, which includes a handle portion 133, extends between and slightly beyond the blocks. Each block 126 and 128 includes a vertically movable die cut pin 134 that have a lower end shaped and sharpened so that the pins may cut or punch holes in a web beneath them. The spacing between the pins 134 is the same as the spacing between the locating pins 36 although the diameter of the pins 134 may, if desired, be slightly larger than that of the pins 36.

The construction and mode of operation of the punch blocks and the actuating bar 132 are conventional. They function in a manner similar to the hole punchers used in offices for punching holes in a paper where the punched holes are used, with metal fasteners, to secure the paper in a file. As best shown in FIG. 6, rotation of the handle 133, in a clockwise direction in FIG. 6, causes the pins 134 to be forced downwardly into axially aligned holes 136 in the transverse member 108 and thereby punch holes in web 44, assuming, of course, that the web is positioned beneath the blocks 126 and 128 at the time. The handle 133 is normally biased to its vertical position, as shown in FIG. 6, and in this position, the pins 134 do not extend below the lower surfaces of the blocks 126 and 128 so that the web 44 may freely pass between the blocks and the upper surface of the member 108.

The fixture 86 also includes an optical instrument assembly 138. This assembly has a holder 142 for holding a horizontally disposed magnifying lens 144, preferably having central, transverse cross hair 145. The holder 142 is mounted for sliding along a transverse bar 146 that extends across and over the longitudinal web path defined by the fixture 86. The optical instrument assembly 138 is also mounted on the bar 146 so that it will always remain in a fixed, generally horizontal position, parallel to the table top 82.

The ends of the bar 146 are mounted in generally L-shaped brackets 148 that are, in turn mounted on the side bars 92 and 94 by socket head cap screws 152. The brackets 148 are positioned and mounted along the side bars so that there is a preselected, longitudinal distance between the centers of the cross hair 145 of the lens 144 and the pins 134 in the blocks 126 and 128. The holder 142 and lens 144 are adapted to be moved along the longitudinal axis of the bar 146 by the operator so as to locate the lens 144 above a registration mark on the web 44.

In use, the operator inserts the leading end of the web 44 into the fixture 86 so that the leading edge first passes between the members 108 and 122 (and the blocks 126 and 128). He then pulls the web along the fixture's longitudinal path until it passes beneath the optical instrument assembly 138. Thereafter, by moving the holder 142 and the web 44, he or she positions the web so that a web registration mark is located beneath the center of the cross hair of the lens 144. Maintaining the web 44 in that position, he reaches over and rotates the handle 133 so that a pair of holes are punched in the web by the pins 134.

The operator then withdraws the leading end of the new web 44 from the fixture 86. He or she may, at this point, trim the leading end so that the punched holes in the web 44 are closely adjacent to the trimmed leading edge of the leading end of the web. The trimmed portion of the new web can, of course, be discarded.

If the new roll 42 is disposed out from beneath the stand 38, as shown in FIG. 1, the operator can push that roll back beneath the stand and begin feeding the web's leading end, with the punched holes, into the splicer 12. The new web 44 is fed into the splicer 12 past the side of the anvil 28, opposite from the side where the web 48 is running. The leading edge of the leading end of the web is positioned adjacent to the locating pins 36 that are on the same, non-running web side. The operator then places the web holes over these locating pins 36. All of this requires only a short time and can be done without the operator having to measure or "eyeball" anything while leaning over or bending into the splicer. Once the web holes are placed over the locating pins 36, the operator causes the splicer 12 to clamp the new web 44 in place against the side of the anvil 28. The operator may next cut the leading end of the new web 44 so that the leading edge of the new web is aligned with the upper edge or top 34 of the anvil 32 as shown generally in FIG. 2. The new web 44 is then in position for splicing, which as noted, will occur when the splicer 12 is actuated, either manually or by a control system which senses that the expiring roll 46 has reached a preselected minimum diameter. Once the splicer is actuated, the sensor 54 senses the passage of the next registration mark on the running web 48. The sensor then signals the splicer to complete the splice.

As noted above, the present invention may be employed with a variety of webs and with webs having patterns of different repeat lengths. One such web is a non-woven material used for making disposable diapers. The pattern repeat length on this web is 22.0 inches, the distance between adjacent registration marks on the web is 22.0 inches, and the width of the web is 20.0 inches. For this web, the distance between the cross-hair 145 of the lens 144 and the punch pins 134 is 16.0 inches. Similarly the distance between the anvil's reference position edge 32 and the locating pins 36 is 12.0 inches, and between that edge 32 and the sensor 54 is 16.0 inches. The distance between the individual pins of pair 134 and between the individual pins of pair 36 is 7.0 inches.

As will be apparent from the foregoing description, the present invention greatly facilitates an operator's preparation and positioning of a new web for splicing. It minimizes the time that he or she must spend in preparing the new web for a splice and reduces dramatically the time that he or she must spend in introducing the new web into the splicer and arranging the web in the splicer for an appropriate splice. In effect, the operator need not make any measurements or any precise positioning of the web since the accurate position is achieved by the simple expedient of putting the holes over the locating pins.

The preferred embodiment of the present invention has now been described. This preferred embodiment constitutes the best mode contemplated by the inventors for carrying our their invention. Because the invention may be copied without copying the precise details of the preferred embodiment, the following claims particularly point out and distinctly claim the subject matter which the inventors regard as their invention and wish to protect.

We claim:

1. An improved method of preparing and positioning the leading end of a new web for splicing in a splicer where the new web is wound on a roll and is to be spliced to a web that is running from an expiring roll and through the splicer and a downstream web processing operation; where the new web and the running web each have an identical, regularly repeating and longitudinally spaced patterns thereon, which patterns need to be matched during splicing so that the regular repetition and longitudinal spacing of the patterns continues uninterruptedly across the splice; where the new web and the running web each have a series of regularly, longitudinally spaced registration marks thereon, which registration marks have a predetermined relationship with respect to the patterns on the webs and with respect to adjacent registration marks; and where the splicer includes a pre-splice, web reference position for the leading end of the new web, a signal generating sensor for sensing the passage of a registration mark on the running web, with the sensor being spaced a predetermined distance from the pre-splice reference position, and means for actuating the splicing of the webs upon the receipt of a signal from the sensor, the improved method comprising the steps of:

identifying at least one point which has a preselected relationship with an adjacent registration mark on the leading end of the new web;

marking this identified point on the leading end of the new web; and positioning the leading end of the new web in the splicer so that the leading end is ready for splicing and so that there is a preselected relationship between the marked point on the new web and the pre-splice reference position of the splicer.

2. The improved method of claim 1 wherein the splicer includes at least one pin disposed thereon; and which includes the further steps of: punching at least one hole in the new web at the identified point; and placing the punched web hole over the pin.

3. The improved method of claim 1 which includes the further steps of identifying at least two points on the new web, where each of the points have the first preselected relationship with the adjacent registration mark and have a predetermined relationship with each other; punching a hole in the new web at each of the identified points; and introducing the leading end of the new web into the splicer so as to prepare the leading end of the new web for splicing in the splicer; wherein the splicer includes at least two pins disposed therein, with the pins having the same predetermined relationship with each other as the punched web holes have with each other and with the pins being disposed in a preselected relationship with the pre-splice reference position of the splicer; and which includes the further step of placing the punched web holes over the pins so as to position the leading edge of the new web with respect to the pre-splice reference position of the splicer.

4. The improved method of claim 3 which includes the further steps of clamping the leading end of the new web with respect to the splicer after the punched web holes have been placed over the pins; and trimming the leading end of the new web so that the newly trimmed leading edge of the leading end of the new web is adjacent to the pre-splicer reference position of the splicer; and discarding the trimmed downstream end of the leading end of the new web.

5. The improved method of claim 4 wherein the pins are disposed along the path of travel of the running web in the splicer; wherein the punched web holes in the new web are aligned along a line perpendicular to the longitudinal axis of the new web; and wherein discarding of the trimmed downstream end of new web includes removing the trimmed downstream end from the pins prior to the splicing of the new web to the running web.

6. The improved method of claim 5 which includes the further step of cutting the new web, downstream from the punched holes, after the punched web holes are punched and before the new web is introduced into the splicer so that the newly cut downstream edge of the leading end of the new web is relatively close to the punched holes.

7. The improved method of claim 3 wherein a work space is defined adjacent to the splicer and is readily accessible to the splicer operator for preparing the new web for a splice; and which includes performing the steps of identifying the points and punching the holes in the new web while the leading end of the new web is disposed in the work space.

8. The improved method of claim 7 wherein a movable table is disposed in the work space; wherein the movable table includes: a fixture for guiding the leading end of the new web along a preselected path on the movable table; a hole puncher disposed at a predetermined position along the preselected path; and an optical instrument that is disposed downstream from the hole puncher a fixed, preselected distance and that is movable transversely to the longitudinal axis of the preselected path; and which includes the further steps of: inserting the leading end of the new web in the guide fixture; aligning a registration mark on the leading end of the new web with the optical instrument; actuating the hole puncher so as to punch at least one hole in the leading end of the new web while maintaining the leading end of the new web so that the registration mark remains aligned with the optical instrument; removing the leading end of the new web from the guide fixture on the movable table; and introducing the leading end of the new web into the splicer.

9. The improved method of claim 8 which includes the further steps of clamping the leading end of the new web with respect to the splicer after the punched web holes have been placed over the pins; and trimming the leading end of the new web so that the trimmed leading edge of the leading end of the new web is adjacent to the pre-splicer reference position of the splicer; and discarding the trimmed downstream end of the leading end of the new web.

10. The improved method of claim 9 wherein the pins are disposed along the path of travel of the running web in the splicer; wherein the punched holes in the new web are aligned along a line perpendicular to the longitudinal axis of the new web; and wherein discarding of the trimmed downstream end of new web includes removing the trimmed downstream end from the pins prior to the splicing of the new web to the running web.

11. The improved method of claim 10 which includes the further step of cutting the new web, downstream from the punched holes, after the punched web holes are punched and before the new web is introduced into the splicer so that the newly cut downstream edge of the leading end of the new web is relatively close to the punched holes.

12. An improved apparatus for preparing the leading end of a first roll of new web material for splicing, in a splicer, to a running web that is being run from an expiring roll and through the splicer and a web processing operation downstream from the splicer, where both the new web and the running web each have an identical, regularly repeating and longitudinally spaced patterns thereon, which patterns need to be matched during splicing so that the regular repetition and longitudinal spacing of the patterns continues uninterruptedly across the splice; where the new web and the running web each have a series of regularly, longitudinally spaced registration marks thereon, which registration marks have a predetermined relationship with respect to the patterns on the web and with respect to adjacent registration marks, the improved apparatus comprising:

a movable table adapted to be positioned in a work space adjacent to the splicer and readily accessible to the splicer operator for preparing the leading end of the new web for splicing; a fixture mounted on the table and defining a path for receiving and longitudinally guiding the leading end of the new web when the new web is inserted into the fixture; a hole puncher mounted on the table adjacent to the path and adapted to punch at least one hole in the leading end of the new web when the leading end of the new web is in the fixture; and an optical instrument disposed adjacent to the path and movable transversely across the path, the optical instrument being spaced a preselected distance from the hole puncher along the path and being adapted for use by the operator so that by moving the new web along the path, the optical instrument may be selectively disposed above and aligned with a registration mark on the new web.

13. In an improved splicer for splicing a leading end of a first roll of new web material to a running web which is being run from an expiring roll and through the splicer and a web processing operation downstream from the splicer; where the new web and the running web each have an identical, regularly repeating and longitudinally spaced pattern thereon, which patterns need to be matched during splicing so that the regular repetition and longitudinal spacing of the pattern continues uninterruptedly across the splice, where the new web and the running web each have a series of longitudinally and regularly spaced registration marks thereon, which registration marks have a predetermined relationship with respect to the patterns on the webs and with respect to adjacent registration marks, and where the splicer includes a predetermined pre-splice reference position for the leading end of the new web, the improvement comprising:

a pair of pins mounted on the splicer and adjacent to the running web, with the pins being a predetermined distance downstream from the pre-splice reference position and being adapted to receive holes that are in the web and that are spaced a predetermined distance from a reference mark on the new web; and a signal generating sensor for sensing the passage of a registration mark on the running web, with the sensor being mounted on the splicer and being spaced a predetermined distance from the pre-spliced reference position; and means for actuating the splicing of the new and running webs upon the receipt of a signal from the sensor.

* * * * *